(12) United States Patent
Peza Ramirez et al.

(10) Patent No.: US 10,333,717 B2
(45) Date of Patent: Jun. 25, 2019

(54) TIMESTAMPED LICENSE DATA STRUCTURE

(71) Applicant: Microsoft Technology Licensing, LLC, Redmond, WA (US)

(72) Inventors: Carlos Peza Ramirez, Redmond, WA (US); Juhi Bagrodia, Bellevue, WA (US); Harold E. Beyel, III, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 78 days.

(21) Appl. No.: 15/454,462

(22) Filed: Mar. 9, 2017

(65) Prior Publication Data

US 2018/0260538 A1    Sep. 13, 2018

(51) Int. Cl.
*H04L 29/06*    (2006.01)
*H04L 9/32*    (2006.01)
*G06F 21/10*    (2013.01)

(52) U.S. Cl.
CPC .......... *H04L 9/3247* (2013.01); *G06F 21/105* (2013.01); *H04L 9/3297* (2013.01); *G06F 2221/0768* (2013.01); *G06F 2221/2151* (2013.01)

(58) Field of Classification Search
CPC ........ G06F 21/12; G06F 21/105; G06F 21/10; G06F 2221/0773; G06F 2221/0768; H04L 9/3247; H04L 9/3297; H04L 9/30; H04L 9/3242
USPC ........................................................ 713/155
See application file for complete search history.

(56) References Cited

U.S. PATENT DOCUMENTS

| | | | | |
|---|---|---|---|---|
| 5,001,752 A | * | 3/1991 | Fischer | G06F 21/87 380/30 |
| 6,192,131 B1 | * | 2/2001 | Geer, Jr. | G06F 21/33 380/247 |
| 7,904,725 B2 | * | 3/2011 | Pavlicic | G06Q 20/02 713/155 |

(Continued)

OTHER PUBLICATIONS

Usama, Mohab, and Mohamed Sobh. "Software Copy Protection and Licensing based on XrML and PKCS# 11." Communications, Computers and Signal Processing (PacRim), 2011 IEEE Pacific Rim Conference on. IEEE, 2011.*

(Continued)

*Primary Examiner* — Syed A Zaidi

(57) ABSTRACT

Technology is disclosed herein for a timestamped license data structure. In at least one implementation, program instructions stored on one or more computer readable storage media, when executed by a processing system, direct the processing system to at least, responsive to a launch of an application, obtain a license file for the application, the license file comprising a license data structure comprising: a user license; a licensing service signature; a licensing service public key; and a trusted timestamp package. The processing system is also directed to analyze the license data structure using the trusted timestamp package to determine if the licensing service public key was valid when the user license was signed by the licensing service signature if the licensing service public key is invalid. If the licensing service public key was valid when the user license was signed by the licensing service signature: enable features of the application.

20 Claims, 12 Drawing Sheets

(56) References Cited

U.S. PATENT DOCUMENTS

| | | | |
|---|---|---|---|
| 8,086,859 B2 | 12/2011 | Pavlicic | |
| 8,528,109 B2 | 9/2013 | Asipov et al. | |
| 8,539,240 B2 | 9/2013 | Sweazey | |
| 2001/0013064 A1* | 8/2001 | Cox | G06F 8/61 709/220 |
| 2005/0138387 A1* | 6/2005 | Lam | G06F 21/123 713/185 |
| 2005/0289072 A1* | 12/2005 | Sabharwal | G06F 21/10 705/59 |
| 2006/0206712 A1 | 9/2006 | Dillaway et al. | |
| 2007/0100762 A1* | 5/2007 | Luo | G06F 21/105 705/59 |
| 2007/0168657 A1* | 7/2007 | Carro | G06F 21/645 713/156 |
| 2007/0180225 A1* | 8/2007 | Schmidt | H04L 9/321 713/152 |
| 2008/0183625 A1* | 7/2008 | Onders | G06Q 10/08 705/59 |
| 2009/0092253 A1* | 4/2009 | Asipov | G06F 21/10 380/278 |
| 2009/0254482 A1 | 10/2009 | Vadlamani et al. | |
| 2010/0169948 A1* | 7/2010 | Budko | G06F 21/53 726/1 |
| 2010/0217992 A1* | 8/2010 | Hamlin | G06F 21/34 713/176 |
| 2014/0095394 A1 | 4/2014 | Hughes et al. | |

OTHER PUBLICATIONS

"Code signing certificate has expired the role of the timestamp", http://www.xaazg.com/86802014.html, Published on: Dec. 3, 2010, 1 page.

"Time Stamping Authenticode Signatures", http://web.archive.org/web/20110926104655/http:/msdn.microsoft.com/en-us/library/windows/desktop/bb931395(v=vs.85).aspx, Published on: Sep. 26, 2011, 4 pages.

* cited by examiner

TIMESTAMPED LICENSE DATA STRUCTURE

TECHNICAL BACKGROUND

Software products such as operating systems and application programs often contain materials that are protected under copyright law, which grants the author of a piece of original work (e.g., software code) exclusive rights over the usage and distribution of the work. To obtain a copy of a software product from a vendor who owns rights to that software product, a user typically enters into a license agreement with the vendor, which governs how the user may use and/or distribute the software product. For example, the license agreement may restrict the number of times a user can install the software and/or the number of computers on which the software can be installed.

An "activation" process is often completed when an attempt is made to install a copy of a software product. This process may be designed to determine whether the copy is authorized for installation (e.g., whether the copy was legitimately purchased by the user) and/or whether the installation is in compliance with one or more applicable license agreements (e.g., whether the user has exceeded a maximum number of permitted installations). Some conventional software activation techniques use a "product key," which is a piece of information made available to a user when the user legitimately purchases or otherwise legitimately obtains a copy of a software product.

The product key is typically tied to a single edition of software. For example, where a software product is offered in multiple editions (e.g., professional and home editions), the product key allows the user to install only the edition unlocked by the product key. During the activation process, the user provides the product key, which when accepted or validated, gives the user permission to complete the installation. Thus, the copy of the software product acquired by the user is installed on the user's computer. However, if the product key does not match the copy of the software product acquired by the user, then the installation is not allowed to continue, and the user must acquire the appropriate edition of software that matches the product key in order to complete the installation properly.

Each edition of the software product, which is enabled by a corresponding product key, has a separate installation program offering different sets of features within the installed program. Thus, a home or more basic edition of a software product that has a different set of features in its installed program than a professional or more advanced edition of the software product will correspondingly have a different installation program than the professional edition. Some of the features between the editions may overlap, but others may only be offered in their respective edition. To offer a third edition offering yet another distinct set of features than those offered by the home or professional editions, a third installation program is required to install the appropriate features. Accordingly, under such a scenario, even a slight change in the number of offered features in one edition versus another causes a new product key/installation program pair to be created.

Overview

Examples discussed herein relate to activation of a set or subset of features of a full feature set of a software product installed without a product key when the software product is launched. In an implementation, a computing apparatus comprises one or more computer readable storage media, a processing system operatively coupled with the one or more computer readable storage media, and program instructions stored on the one or more computer readable storage media for authenticating a user license for an application after the application has launched. When executed by the processing system, the program instructions direct the processing system to at least, responsive to a launch of the application, obtain a license file for the application, the license file comprising a license data structure that includes: a user license; a licensing service signature; a licensing service public key; and a trusted timestamp package. The processing system is further directed to verify validity of the licensing service public key. If the licensing service public key is invalid, the license data structure is analyzed using the trusted timestamp package to determine if the licensing service public key was valid when the user license was signed by the licensing service signature. If the licensing service public key was valid when the user license was signed by the licensing service signature, the processing system is further directed to enable features of the application based on the user license and initiate presentation of the application in accordance with the enabled features.

In another implementation, a method for authenticating a user license for an application after the application has launched comprises, responsive to a launch of the application, obtaining a license file for the application, the license file having a license data structure that includes: a user license; a licensing service signature; a licensing service public key; and a trusted timestamp package. The method also includes verifying validity of the licensing service public key. If the licensing service public key is invalid, the license data structure is analyzed using the trusted timestamp package to determine if the licensing service public key was valid when the user license was signed by the licensing service signature. If the licensing service public key was valid when the user license was signed by the licensing service signature, the method further includes enabling features of the application based on the user license and initiating presentation of the application in accordance with the enabled features.

In another implementation, one or more computer readable storage media having program instructions stored thereon for authenticating a user license for an application after the application has launched, wherein the program instructions, when executed by a processing system, direct the processing system to at least obtain a license file comprising a license file for an application responsive to a launch of the application, the license file comprising a license data structure that includes a user license; a licensing service signature; a licensing service public key; and a trusted timestamp package. The license data structure is analyzed using the trusted timestamp package to determine if the licensing service public key was valid when the user license was signed by the licensing service signature. If the licensing service public key was valid when the user license was signed by the licensing service signature, processing system is further directed to enable features of the application based on the user license and initiate presentation of the application in accordance with the enabled features.

This Overview is provided to introduce a selection of concepts in a simplified form that are further described below in the Detailed Description. It may be understood that this Overview is not intended to identify key features or essential features of the claimed subject matter, nor is it intended to be used to limit the scope of the claimed subject matter.

BRIEF DESCRIPTION OF THE DRAWINGS

In order to describe the manner in which the above-recited and other advantages and features can be obtained, a more particular description is set forth and will be rendered by reference to specific examples thereof which are illustrated in the appended drawings. Understanding that these drawings depict only typical examples and are not therefore to be considered to be limiting of its scope, implementations will be described and explained with additional specificity and detail through the use of the accompanying drawings.

DETAILED DESCRIPTION

Figure 1:
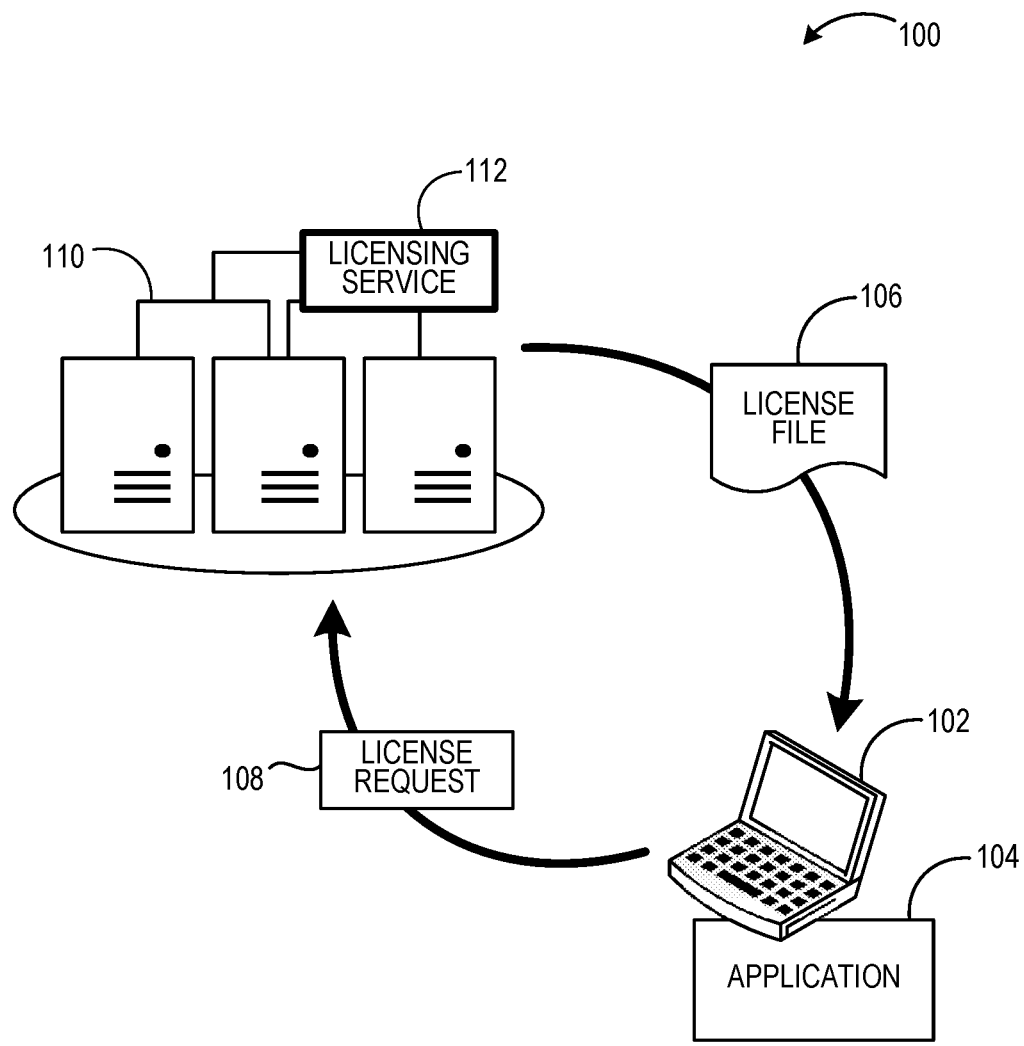
FIG. 1 illustrates a schematic diagram of a system for launching an application without a product key and requesting license information therefor according to some embodiments.

Examples are discussed in detail below. While specific implementations are discussed, it should be understood that this is done for illustration purposes only. A person skilled in the relevant art will recognize that other components and configurations may be used without parting from the spirit and scope of the subject matter of this disclosure. The implementations may be a machine-implemented method, a computing device, or a computer readable medium.

Embodiments disclosed herein set forth methods and systems for application licensing according to various criteria and techniques. As used herein, the term "application" may refer to an application, program, or service implemented within a computing environment. Applications that may be utilized in accordance with the licensing service described herein include, but are not limited to, MICROSOFT WORD, MICROSOFT EXCEL, MICROSOFT POWERPOINT, MICROSOFT VISIO, or MICROSOFT OUTLOOK, all of which are available from Microsoft Corporation of Redmond, Wash. Applications may be provided to a computing device by a marketplace service, or any of a number of third party services, via a network. Various different types of licenses, or entitlements, for such applications can be obtained through a variety of different methods.

References to the licensing service herein refers to any location or source of the license file(s) provided to an application requesting a license. In one example, the licensing service resides on a separate or remote system and includes the license file source when referring to the licensing service herein. An example of such a remote licensing service may be referred to as the "Office Licensing Service" or "OLS" since it may be used to license MICROSOFT OFFICE, i.e., "Office" applications available from Microsoft Corporation of Redmond, Wash., such as the ones listed above. However, it is to be understood that the licensing service may also be used to license any other suitable types of applications available from any number of providers. In another example, the same operating system running the application may include a built-in source of licenses from which the license file is acquired. A license store in the operating system may thus be the license file source when referring to the licensing service herein.

Application licensing described herein solves the problems discussed above with respect to the use of separate installations of application binaries by providing activation of a full installation of application having all the features available but selectable using a license data structure rather than a product key.

Techniques are described that allow an application, which contains a full set of features and functions, to activate a set or subset of the full feature set based on a license data structure contained within a license file. In an implementation, after launch of the application, the application evaluates the license data structure of the user's license to determine the features available to the user. In addition, the location of the license data structure enables different licensing to be available to the application. In addition, the license data structure can be backed by a trusted timestamp to allow use of the application even if communication with the licensing service is unavailable. In addition, the license data structure enables combining multiple user licenses into a single license that allows a superset of applications features to be available to the user based on licenses approved for the user. The license data structure also allows features of the program to be available to the user beyond the features provided by the license purchased by the user.

A technical effect provided by the techniques disclosed herein is the ability of a software program to determine, after its launch, which features thereof a user is allowed to access based on the license the user is entitled to. While the software program may include every feature able to be made available to users, a particular user license may permit user access to less than all of the available features. Only the features permitted for the user based on the license are allowed, while the remaining features are disabled and/or hidden.

FIG. 1 illustrates a schematic diagram of a system 100 for launching an application without a product key and requesting license information therefor according to some embodiments. System 100 includes a device 102 having an application 104 installed thereon. Application 104 represents an application offering various allowable features to users based on the type of license available to the user. As used herein, "features" of the application refer to features, services, modes, options, and other aspects of the application that are enabled or disabled based on the licensing permissions available to the user. Through a variety of license options available for purchase or acquisition by the user, the number of allowable features available when the application is launched may range from zero available features to the complete list of allowable features and to any number of feature combinations therebetween. For example, in an application offering four available features—A, B, C, and D—for activation through respective license purchasing, a first license might make feature A available while another license might make features A and C available. Yet another license might make all features and services A, B, C, and D available. The different licenses may be acquired based on editions of the application purchasable through a vendor. Editions of the application may relate to, for example, a Basic edition, a Home edition, a Student edition, a Professional edition, and the like. Thus, while the application binaries of application 104 do not change, the user experience provided by one license or another does change.

To determine the license available to the user, the application 104 acquires a license file 106 and uses the license file 106 to activate the allowable application features for the user corresponding to the license. In the scenario illustrated in FIG. 1, application 104, via device 102, creates and sends a license request 108 to a server 110 housing a licensing service 112 such as an OLS. The license request 108 includes the information necessary for the licensing service 112 to determine the appropriate license file 106 to send to device 102 in response to the license request 108. The information in the license request 108 may include, for example, user information, time-based information, hardware-based information, location information, operating system (OS) information, etc. The user information may include the identification (ID) or username of the user registered to the user's license. The time-based information may include the time and/or date that the application 104 was launched or that the license request 108 was generated. Hardware-based information may include hardware IDs of one or more components and/or any service IDs that are available within device 102. The location information may include the physical location of device 102, and the OS information may include an identifier of the OS installed on the device 102.

Figure 2:
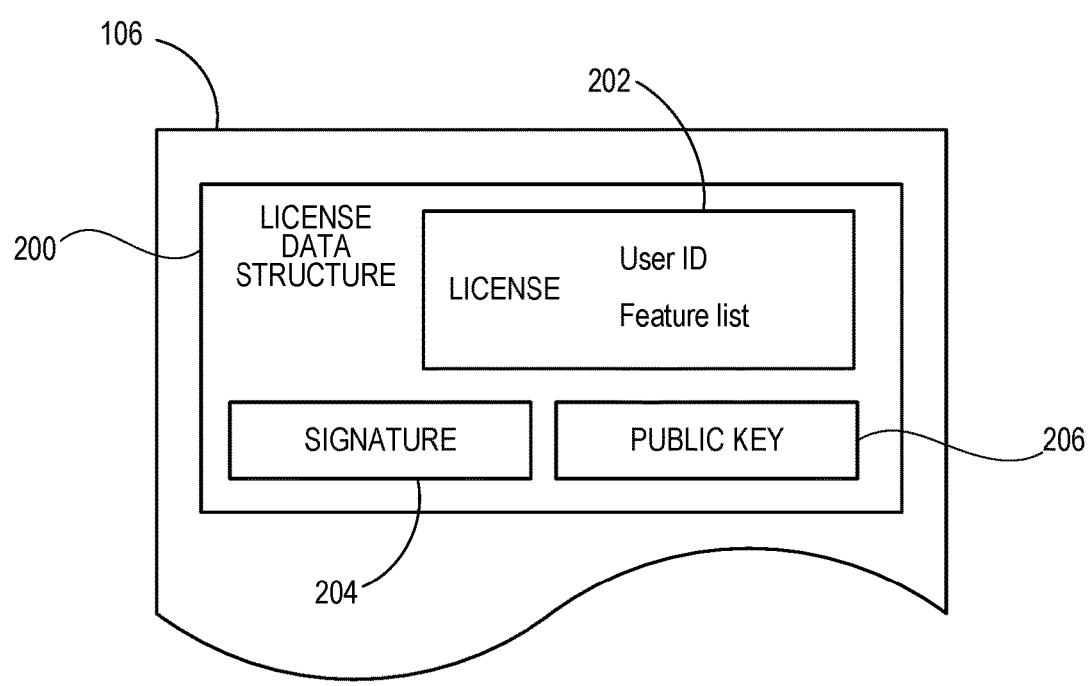
FIG. 2 illustrates an embodiment of a license file according to an embodiment.

Based on the received license file 106, application 104 enables and/or disables features available to the user. FIG. 2 illustrates an embodiment of license file 106 according to an embodiment. The license file 106 includes a license data structure 200 defining a user license 202, a signature 204, and a public key 206. License 202 may specify the user ID of the user associated with the license and includes the list of features enabled by the license. The list of features may include the applications pertaining to the license and any individual features within the applications that are enabled. The signature 204 and public key 206 are included to provide authentication of the license file 106 and to prove that the license file 106 comes from the appropriate authority using techniques known in the art.

Figure 3:
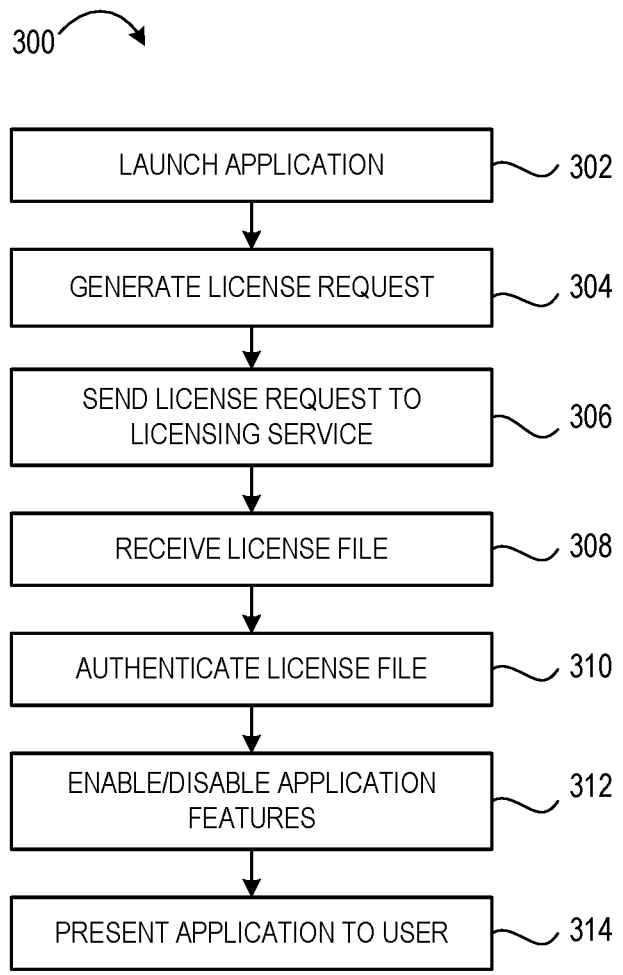
FIG. 3 is a process flow diagram of a method for activating features of an application each time the application is launched according to an embodiment.

FIG. 3 is a process flow diagram of a method 300 for activating features of an application each time the application is launched according to an embodiment. The method 300 begins at block 302 with the launch of the application. The application may be launched or otherwise engaged in a variety of ways. For example, the application may be launched in response to a user input or command, such as a touch, click, or gesture indicative of a desire to engage with the application. The application includes features available to users based on a number of different licenses, and the features to be enabled are not known at launch but are determined via inspection and analysis of the license file available to the user. At block 304, the application generates a license request to be sent to a licensing service for determining the features to be enabled or disabled. Generation of the license request includes, in one example, determining the user ID of any user or of users who have previously used the application based on cached licenses from previous launches. In another example, the user ID may be determined by presenting the user with an option to enter his or her username and/or ID. In another example, the user ID may be determined from the active user account of the operating system from which the application was launched. In yet another example, the user ID may be determined from another application currently running on the system and for which the user is already currently licensed. The other application may be, for example, another application from a suite of related applications such as MICROSOFT OFFICE applications. In addition to getting the user ID, other time-, hardware-, location-, and OS-based information may be gathered as discussed above. The application generates the license request from the gathered information and, at block 306, sends the license request to the licensing service.

The application receives the license file from the licensing service at block 308, and at block 310, authenticates the license file at least in part based on the signature and public key included in the license data structure of the license file. The application analyzes the license included in the license data structure and appropriately enables or disables the allowable features based on the feature list of the license at block 312. The user is then presented with the application at block 314 having the appropriate features enabled according to the user's license.

Embodiments of the invention allow different licensing to be available to the application based on the location or source of the license data structure containing the user's license, which may be determined based on the location or source of the license file. When the licensing service is online or otherwise in communication with the application, the application may treat the licensing service as the default location from which to obtain the user's license. However, if the licensing service is not available to receive the licensing request or to send the license back to the application, the application may be programmed to look for substitute licenses in additional locations in order to allow the user to use the application.

Figure 4:
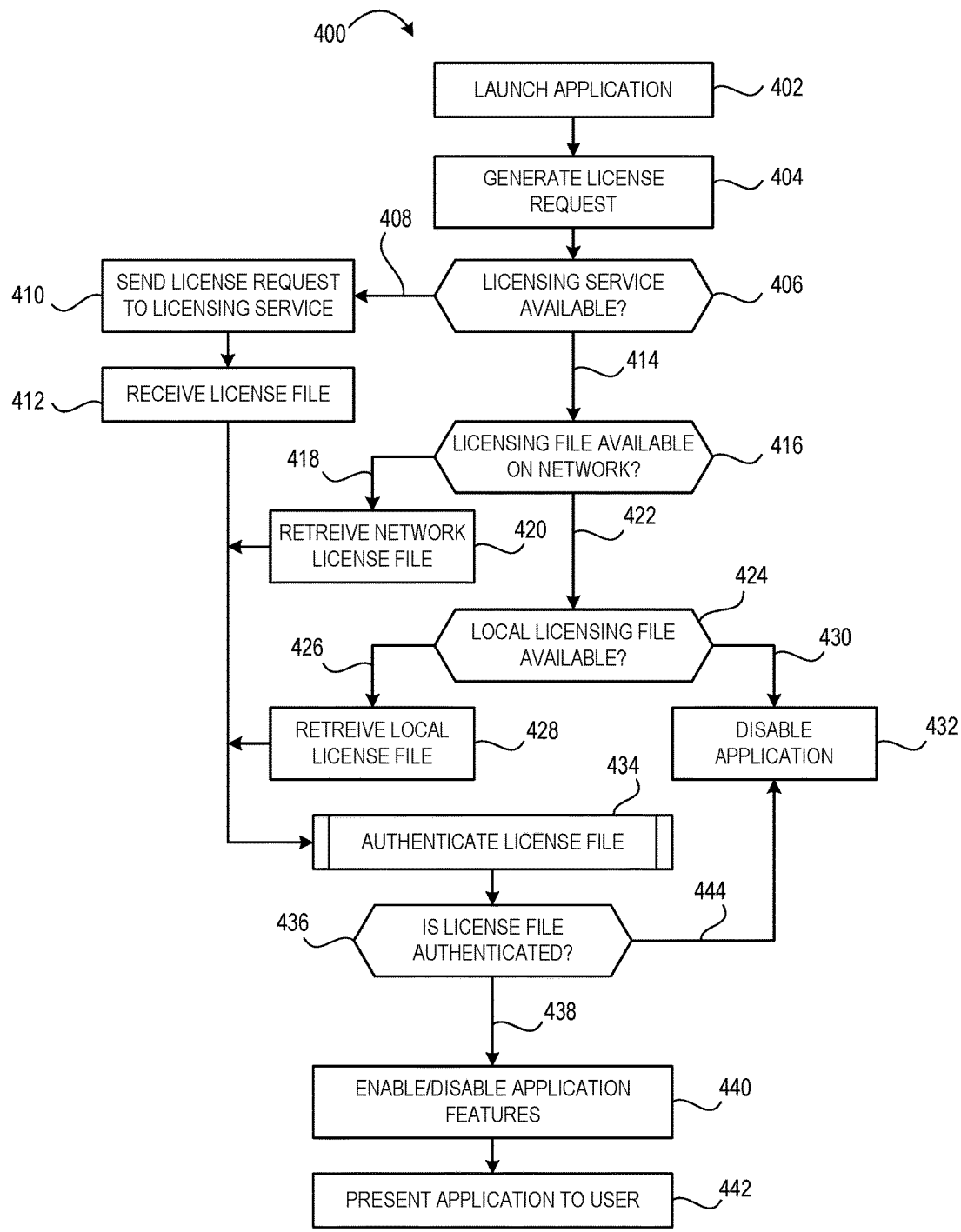
FIG. 4 is a process flow diagram of a method for activating features of an application each time the application is launched according to another embodiment.

FIG. 4 is a process flow diagram of a method 400 for activating features of an application each time the application is launched according to another embodiment. The method 400 begins at blocks 402 and 404 with, respectively, the launch of the application and the generation of a license request in the same or similar manner as described above with respect to blocks 302, 304 of method 300. At block 406, method 400 checks to see whether the licensing service is available. If the licensing service is available to return a license file (408), blocks 410 and 412 respectively send the license request to the licensing service and receive the license file therefrom as described above with respect to blocks 306, 308 of method 300.

If the licensing service is not available or cannot return a license file to the application (414), method 400 begins checking one or more additional locations accessible thereto to try to find and locate a valid and usable license file. In one embodiment, if the licensing service is not available, the application begins searching for the licensing file in one or more networked file or storage locations accessible to the application at block 416. If the license file is found on the network (418), it is retrieved at block 420 for further analysis as described below. However, if the license file is not found on the network (422), local or non-networked storage locations may be checked at block 424 to see if the license file can be found. If a local license file is found (426), it is retrieved at block 428 for further analysis as described below. While not illustrated in FIG. 4, additional locations other than the network and local locations discussed above may be additionally or alternatively checked in order to try to find the valid and usable license file. If no local licensing file is found or if the file cannot be found anywhere accessible by the application (430), method 400 may disable the application at block 432 and prevent the user from accessing any of the features thereof.

The locations of where to search either on the network or on the local machine for the license file may be set, for example, via Group Policy, command strings, or from user inputs during installation of the application. In one example, information technology (IT) personnel of a company may set the network search locations based on default license file storage locations on a company's server during installation of the application on the company's non-server computer. Additional local storage locations may be further input in case the user is not connected to the company's network when the application is launched. In addition, the application may include default local storage search locations such that, if they are set up and exist on the local machine, they can be checked for valid license files in the searching process. For example, the application may set up a default cache storage location to save and store valid licenses received from the licensing service each time the valid license is received.

The search order for obtaining the licensing file may also be varied depending on the application or specified options during installation of the application. For example, while method 400 illustrates attempting to obtain the license file from the licensing service (406) followed by the networked location (416) followed by the local location (424), embodiments of the invention may include varying the order of these searching locations.

Figure 5:
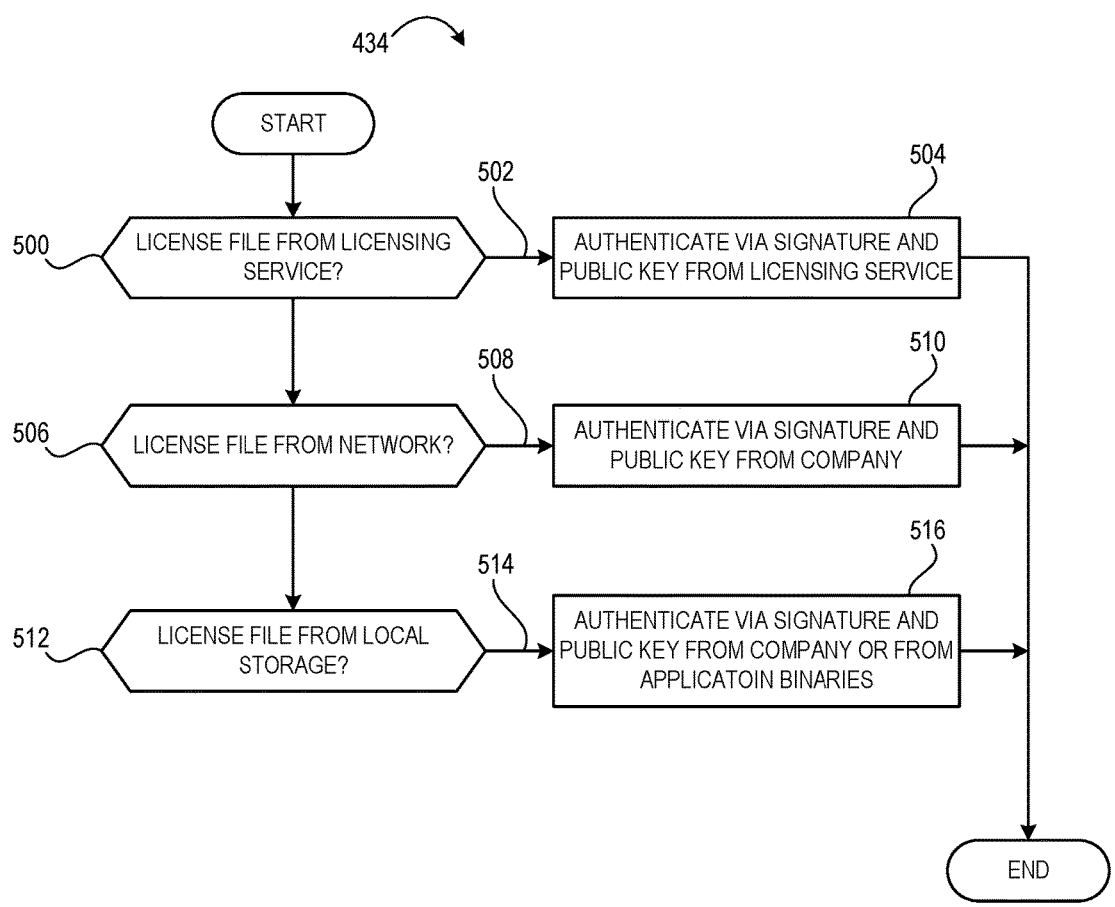
FIG. 5 is a process flow diagram for the authentication of a license file according to an embodiment.

Based on the location from where the license file was received or retrieved, the application may authenticate the user license differently at block 434. Referring to FIG. 5, a process flow diagram of procedure 434 for the authentication of the user license is shown for authenticating the license file. At block 500, if the license file was received from the licensing service (502), authentication of the user license may proceed as described above with respect to block 310. That is, the public key and the signature contained within the license file may be authenticated and validated as coming from the licensing service at block 504. At block 506, if the license file was found on the network (508), the license file may contain a signature and a public key pertaining to the company that, together, allow the user license to be authenticated and validated at block 510 even though the license file did not come from the licensing service. At block 512, if the license file was locally found (514), it could also contain the signature and public key of the company that would allow the user license to be authenticated and validated at block 516. Alternatively, the local license file may be built into the application itself and may be authenticated and validated using a public key of the application's creator. In this case, the local license file may allow the user to use a more-basic edition of the application than what would be available to the user when a non-built-in license file is used.

Referring back to FIG. 4, the user license is checked at block 436 to see whether it is authenticated and validated in block 434. If so (438), it is analyzed and inspected to appropriately enable or disable the allowable application features based on the feature list of the user license at block 440. The user is then presented with the application at block 442 having the appropriate features enabled according to the user's license. If the user license is not authenticated in block 434 (444), method 400 may disable the application at block 432 and prevent the user from accessing any of the features thereof.

Embodiments of the invention allow the license data structure to be backed by a trusted timestamp to allow use of the application even if communication with the licensing service is unavailable. The public key of the license file (e.g., public key 206 of license 202 of FIG. 2) periodically expires after a time period of validity. A valid public key is included in the license file each time the license file is received from the licensing service. As long as the license file can be received from the licensing service, the public key gets continually or periodically updated such that its period of validity remains active for a time. For example, the received public key may include a time period of validity of one day, one week, one month, or another time interval. This time interval can get reset with the receipt of new public keys in the license file from the licensing service. However, in the case where only the local licensing file from the cache location is available for retrieval (block 428 of FIG. 4), the situation might occur where the user is entitled to a perpetual license of the application or to at least a license of a longer period than the validity period of the public key included in the cached license file. For example, it may be that the cached public key has expired before the application is able to connect and communicate with the licensing service. If the application does not have a way to authenticate the license file beyond the time period of validity of the public key, then the user may be prevented from using the application even though the user's license would allow further usage.

Figure 6:
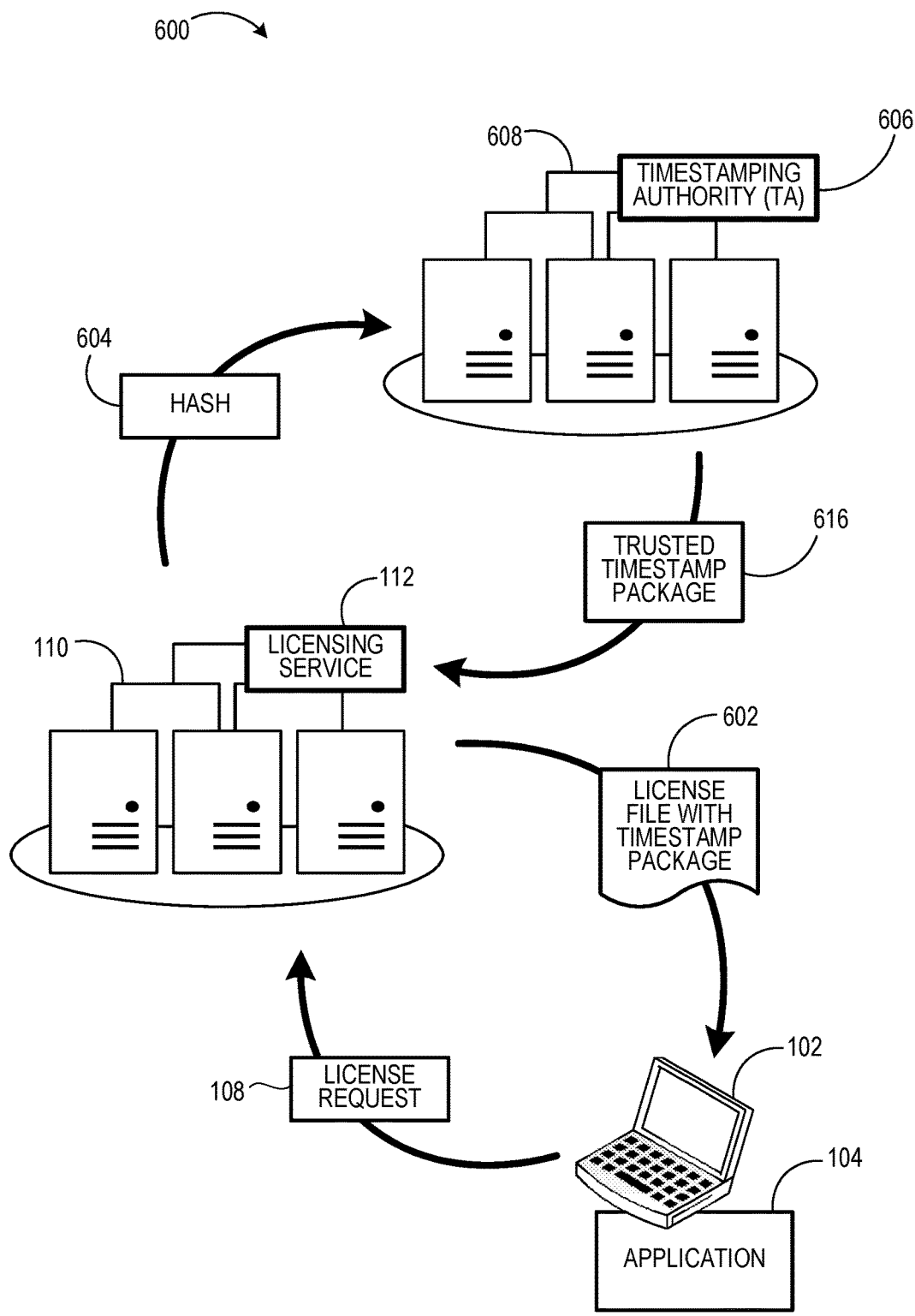
FIG. 6 illustrates a schematic diagram of a system for requesting and receiving a license file with a trusted timestamp according to an embodiment.

Therefore, FIG. 6 illustrates a schematic diagram of a system 600 for requesting and receiving a license file 602 with a trusted timestamp according to some embodiments. System 600 includes the components of system 100 with additional components for updating or converting the license file 106 of FIG. 1 to license file 602 that includes the trusted and signed timestamp.

Figure 7:
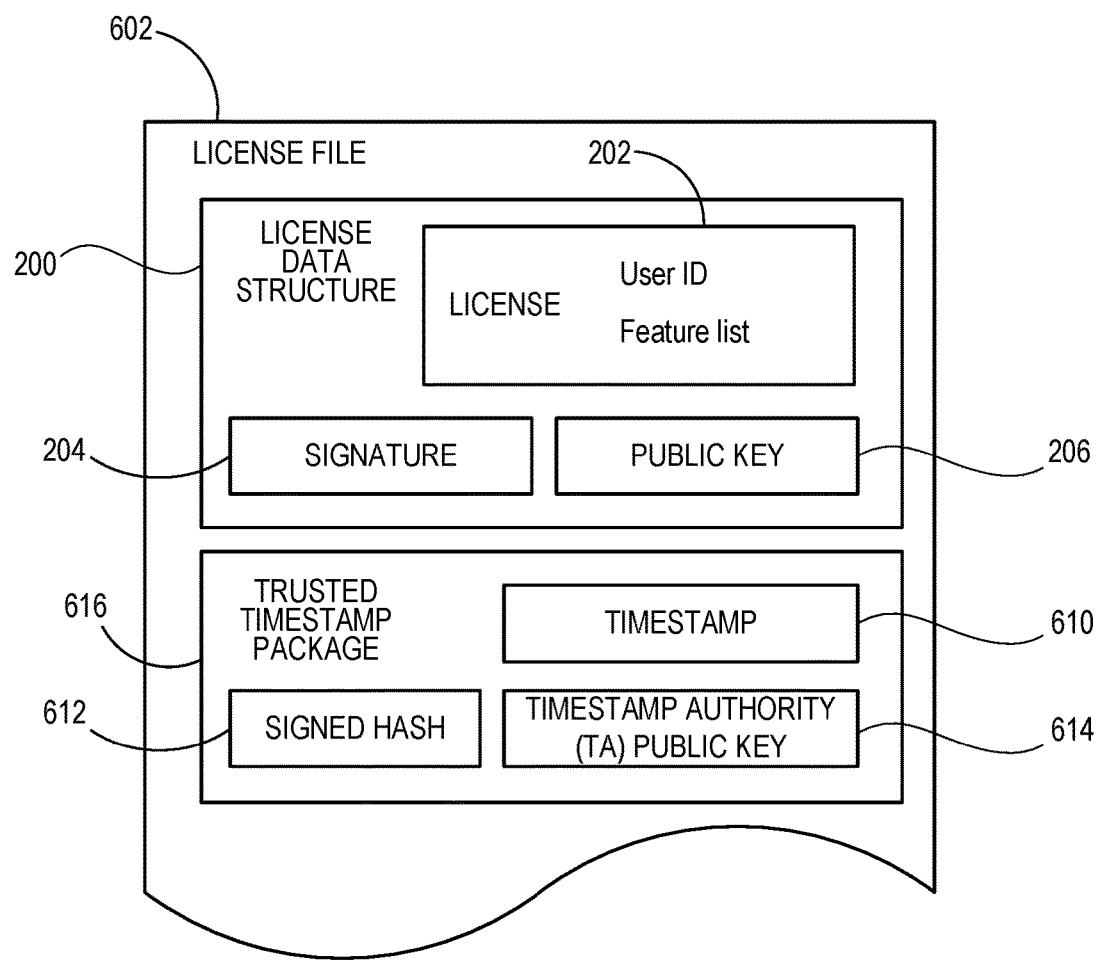
FIG. 7 illustrates an embodiment of a license file according to another embodiment.

After generating the license file 106 illustrated in FIG. 2, licensing service 112 of system 600 creates a hash 604 of the license data structure 200 and sends the hash 604 to a timestamping authority 606 on a third-party server 608. Referring as well to FIG. 7, timestamping authority 606 adds a timestamp 610 to hash 604 and calculates another hash from the result, which is then digitally signed with a private key of the timestamping authority 606 to create a signed hash 612. The signed hash 612, timestamp, and a public key 614 of the timestamping authority (TA) 606 are sent as a trusted timestamp package 616 back to the licensing service 112. Licensing service 112 appends the trusted timestamp package 616 to the license file 106 originally created and sends the modified license file license file 602 to device 102 for processing by application 104.

Figure 8:
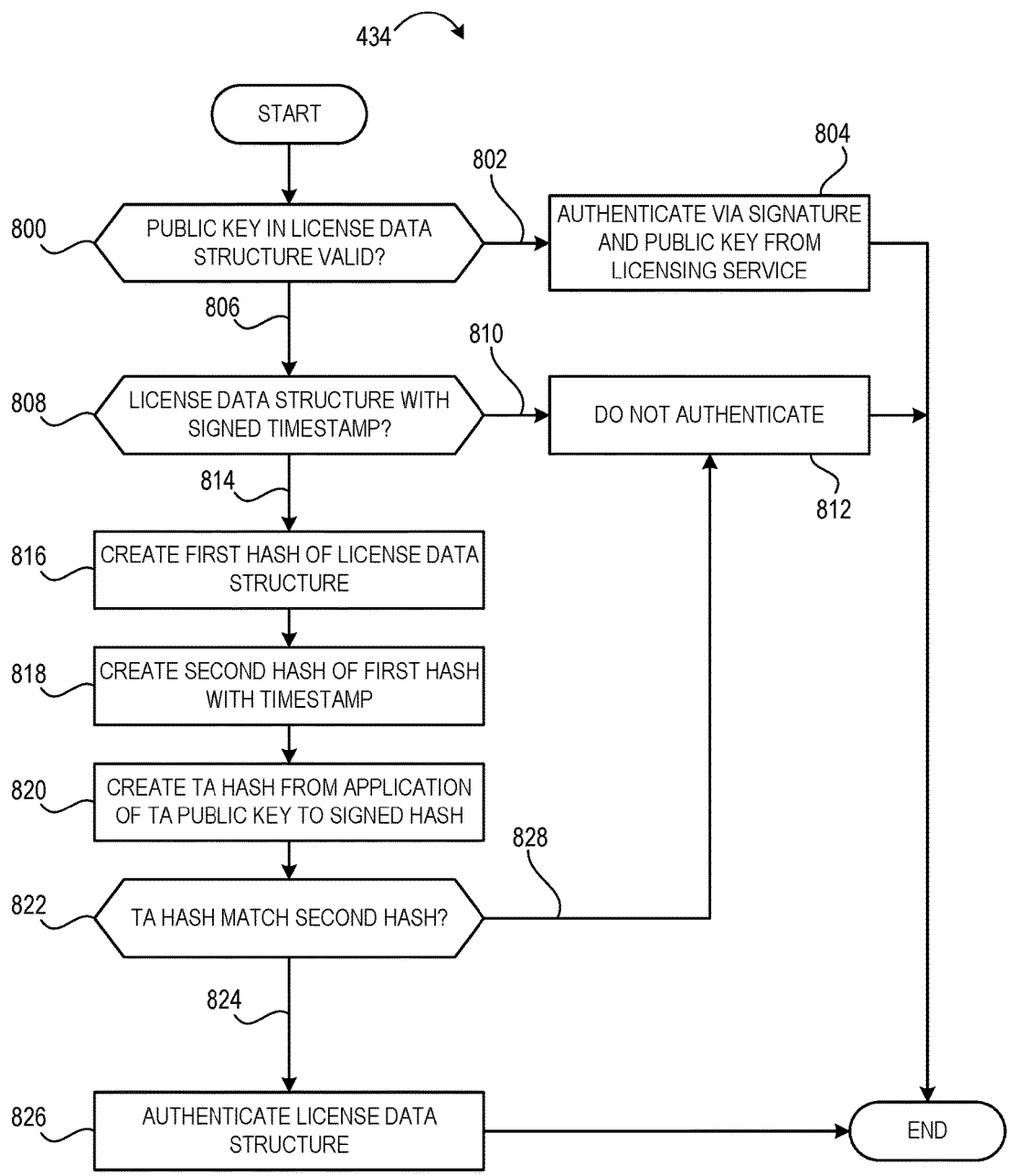
FIG. 8 is a process flow diagram for the authentication of a license file when the license file is cached on a local device according to an embodiment.

FIG. 8 is a process flow diagram of procedure 434 for the authentication of the license file when the license file is cached on the local device according to an embodiment. At block 800, the public key in the license data structure of the license filed is analyzed to determine if it is valid or whether its time of validity has expired. If the public key is still valid (802), then the license data structure is authenticated the other signature and public key received with the license data structure from the licensing service at block 804.

If the public key is no longer valid or has expired (806), that the license file is analyzed to determine if it has been signed with a timestamp from a trusted TA at block 808. If there is no signed timestamp with the license file (810), then the license file is not authenticated at block 812. If the license file does have a signed timestamp from the TA (814), a first hash of the license data structure is created at block 816. The first hash is combined with or appended with the timestamp from the trusted timestamp package at block 818 to create a second hash.

The TA public key is used at block 820 to create TA hash from the TA-signed hash. The TA hash is compared with the second hash at block 822 to see if they match. If so (824), the license data structure is authenticated at block 826 even though the public key from the licensing authority is expired or invalid since the signed timestamp proves that, at the time of receiving the cached license file, the license was signed by a valid public key verified by the timestamp. If the TA hash does not match the second hash (828), then the license file is not authenticated at block 812.

Embodiments of the invention further enable combining multiple user licenses into a single license that allows a superset of applications features to be available to the user based on licenses approved for the user. As discussed above in FIG. 3, the license request sent to the licensing service may include the user ID of the user launching the application. The user ID may be determined from a number of different sources including, for example, one or more users who have previously used the application identified by their user ID, an entered username and/or ID input by a user defining the user ID via a user input, the active user account of the operating system from which the application was launched, and from another application currently running on the system and for which the user is already currently licensed. While the license request may choose between one of the sources to identify the user, the user may, in fact, however, be entitled to two or more different licenses depending on which user ID the user chooses to use. For example, under a first username or user ID, the user may have purchased a Home edition or version of the application to use for personal or other reasons on a computer at home. The user may also be able to use a different edition or version of the application such as a Professional edition under a different username or user ID provided by his workplace, for example.

Figure 9:
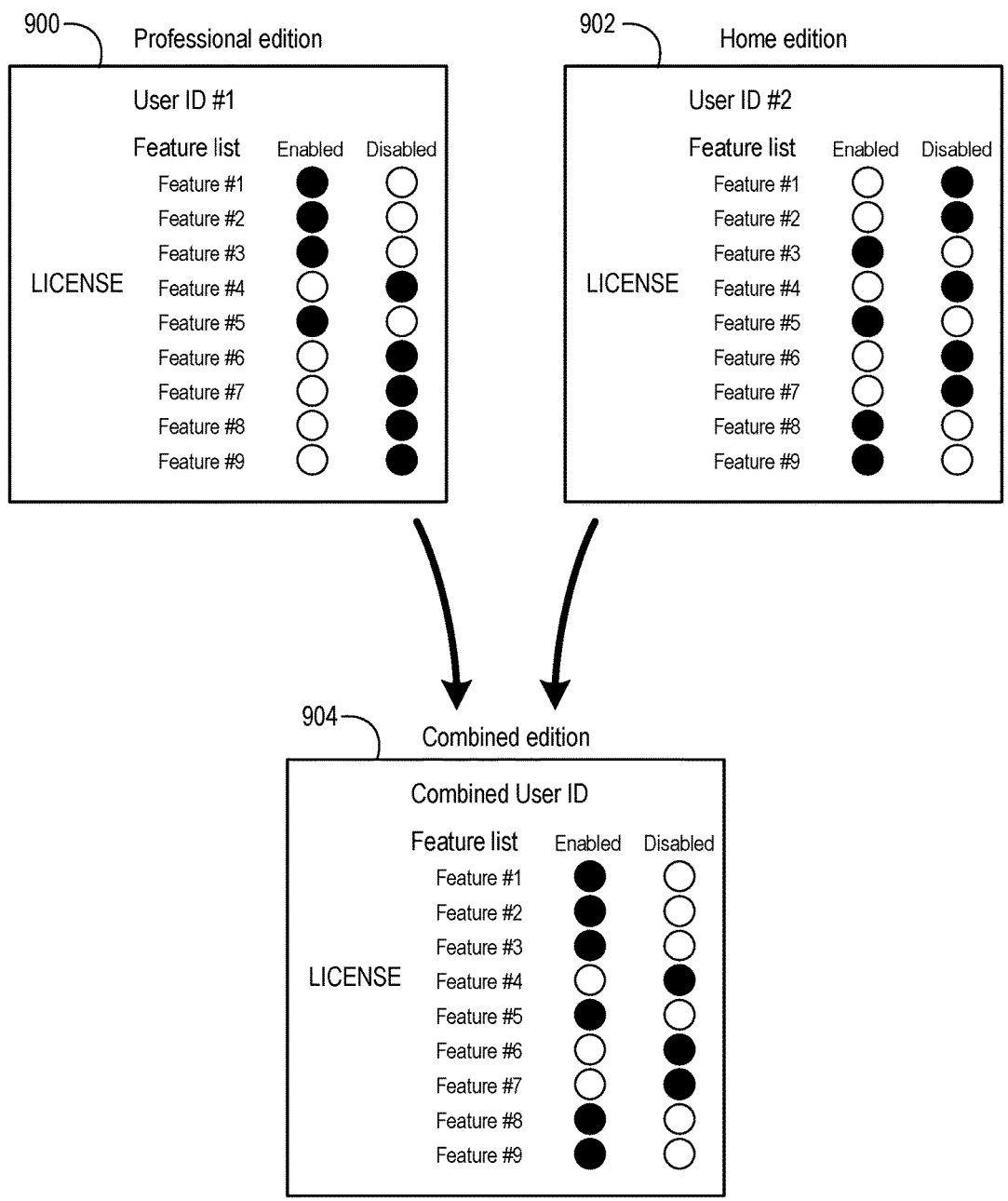
FIG. 9 illustrates a schematic diagram for combining multiple licenses according to an embodiment.

Referring to FIG. 9, in an example scenario, the user's employer may require use of the license of the Professional edition 900 of the application as it contains features enabled for the user to perform his work duties (e.g., Features 1, 2, 3, and 5). However, the user may also prefer to use the benefit of an additional or other feature or features of the application not available in the Professional edition but instead available in a different edition of the same application (e.g., Features 8 and 9). In this case, the user may acquire the license of the different (e.g., Home) edition 902 in order to use the preferred features. These preferred features, however, may not be required to be available to the user all the time that the application is running and may cause some of the features enabled by the Professional edition to be disabled. Accordingly, the user may be forced to quit and re-lunch the application under the different user IDs whenever the one or other feature sets available to the user under the various licenses is desired to be used.

Referring to FIGS. 3 and 9, the application is programmed to present the user with a unified application experience in which all of the features enabled by the user's entitled licenses are made available. Accordingly, at block 304 of method 300, the license request generation includes identifying all of the user IDs available to the user. That is, the different locations or sources from which the user's ID may be concatenated or added together and bundled with the license request before sending the license request to the licensing service. As an example, a separate application such as an email application may be running as having been previously launched by the user under a first user ID. The email application may be a standalone application or may be a web-enabled application running in an Internet browser, for example. Thereafter, the launching of a word processing application causes the application to generate the license request has set forth in method 300 and order to determine which of its features to enable or disable according to the user's license. The word processing application, having previously been used under a license associated with a second user ID of the user may identify the second user ID for inclusion in the license request. However, since the email application is running, the word processing application may query the email application to determine the user ID associated with it. Upon finding that the email application is running under the user's first user ID, the first user ID may be added to the license request together with the second user ID previously added. The word processing application may further continue to investigate other sources or locations of user IDs associated with the user such that if any additional user IDs are found, they may be added to the license request.

In the example scenario illustrated in FIG. 9, the application may determine that the user IDs previously used were user ID #1 and user ID #2. Accordingly, the application may append user ID #1 and user ID #2 together when sending the license request to the licensing service per block 306.

Figure 10:
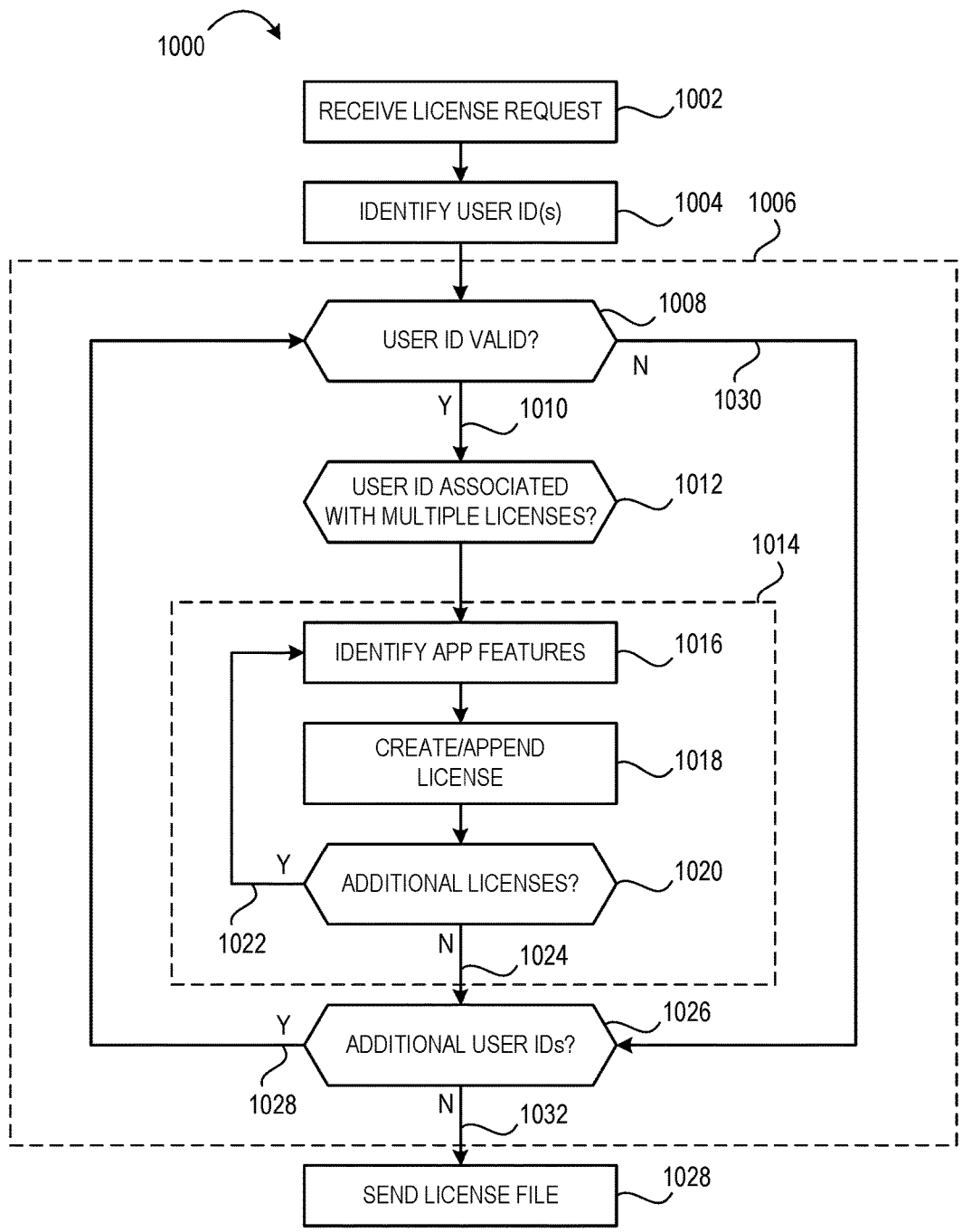
FIG. 10 is a process flow diagram for combining features from multiple licenses into a single feature list according to an embodiment.

FIG. 10 is a process flow diagram of a method 1000 for combining features from multiple licenses into a single feature list according to an embodiment. The licensing service, upon receipt of a license request at block 1002, identifies each user ID in the license request at block 1004, which may include multiple user IDs. For each user ID identified, method 1000 performs the steps associated with an iteration block 1006. Block 1006 includes verifying that a valid license exists for the user ID of the current iteration at block 1008. If a valid license exists for the user ID exists (1010), the user ID is checked to see whether it is associated with multiple licenses at block 1012. For each license associated with the user ID, method 1000 performs the steps associated with an iteration block 1014.

In iteration block 1014, the application features licensed to the user ID are identified at block 1016. In block 1018, a license is either created based on the licensed application features or is appended to in the case that a license was previously created at block 1016. If, at block 1020, additional licenses are associated with the currently-iterated user ID (1022), iteration block 1014 repeats at block 1016 using the next associated license.

If no additional licenses are associated with the currently-iterated user ID (1024), iteration block 1006 determines, at block 1026, whether additional user IDs were identified in the license request at block 1004. If additional user IDs were identified (1028), iteration block 1006 repeats at block 1008 using the next user ID. If the currently-iterated user ID is not found to be valid (1030) at block 1008 and if no additional user IDs are identified for further processing (1032) as determined by block 1026, the processed license file with the created/appended license with enabled application features in the license data structure is sent back to the requesting application at block 1034.

Referring back to FIG. 9, for the valid licenses identified, a single, combined edition license 904 of combined features is created for sending back to the application as part of the license data structure. Thus, the overlapping features enabled by the Professional edition 900 and the Home edition 902 are enabled in the combined edition license 904. In this manner, features 1, 2, 3, and 5 of the Professional edition 900 are ORed or combined with features 1, 2, 4, 8, and 9 of the Home edition 902 to create the aggregated enabled feature list of features 1, 2, 3, 4, 5, 8, and 9 of the combined edition license 904. That is, for each feature available in any of the licenses valid for the user, if the feature is enabled in any of the licenses, it is enabled in the combined edition license 904. Features such as features 4, 6, and 7 that are disabled in each of the licenses to which the user is entitled are likewise not enabled in the combined edition license 904.

While the combined edition license 904 is illustrated as a concatenated license generated from multiple licenses available to the user under distinct user IDs (e.g., user ID #1 and user ID #2), embodiments of the invention contemplate multiple licenses being available to the user under a single user ID. That is, the licensing service may include two or more licenses associated with the single user ID and generate a single, combined edition license 904 therefrom.

As discussed above in FIG. 1, the location information in the license request may include the physical location of device 102. The location information may be used in embodiments of the invention to allow features of the program to be available to the user beyond the features provided by the license purchased by the user. Referring to FIG. 3, the application is programmed to identify the user's location and to include the location in the license request generation. Accordingly, at block 304 of method 300, the license request generation includes identifying the user's location based on the physical location of device 102. In one embodiment, the physical location of device 102 may be determined based on the identity of the provider of the network to which the device 102 is connected. The network may be wired or wireless. In one embodiment, the provider may be identified by the name of its network service set identifier name (or SSID name) if there is one associated with the network. In another embodiment, the provider may be determined by the Internet Protocol ("IP") address of its Internet service. Accordingly, the application may identify either or both of the SSID name and the IP address of the provider's network and bundle them in the generated license request before sending the license request to the licensing service.

The licensing service, upon receipt of a license request including one or more location fields specifying the provider of the network services to which the device 102 is connected, verifies that the provider has a provider ID registered with the licensing service that is configured to enable additional features of the application. If a valid provider ID is found, the license data structure returns to the device 102 includes a license providing a first set of enabled features based on the user's ID and one or more additional sets of enabled features based on the provider's ID. Alternatively, a combined set of user/provider features may be provided.

Figure 11:
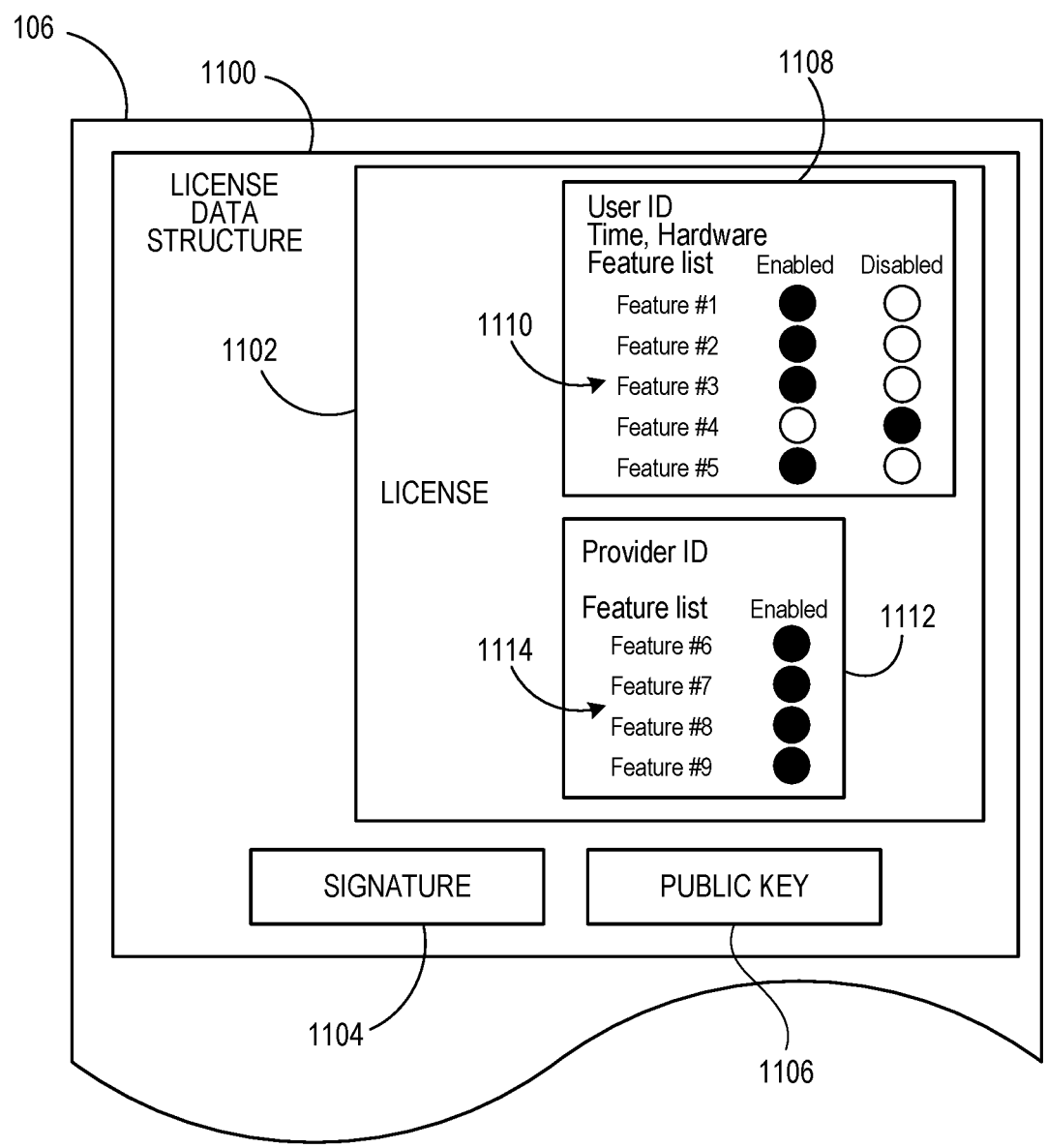
FIG. 11 illustrates an embodiment of a license file according to another embodiment.

FIG. 11 illustrates an embodiment of license file 106 according to an embodiment incorporating enabled features based on the provider ID. The license file 106 includes a license data structure 1100 defining a license 1102, a licensing authority signature 1104, and a licensing authority public key 1106. License 1102 includes a user license 1108 enabling a set of features 1110 for the application based on the license entitled to the user based on the user's ID. License 1102 also includes a provider license 1112 enabling a set of features 1114 for the application based on the license entitled to the provider of the user's network connection based on the provider's ID.

A provider may, for example, offer an Internet connection to its customers in order to promote patronage and purchase of the provider's goods and services. Providers such as cafés, restaurants, and other types of stores and service providers may offer such a service. The features 1114 enabled by the provider's license 1112 offer additional application functionality beyond the functionality enabled by the user's license 1108. For example, the provider's features 1114 may include unique icons or fonts for use in documents and chat messages on device 110 during patronage of the provider. Macros, formulas, and add-ins unique to the provider may also be provided that are designed to benefit the user. For example, the provider may make an ordering feature enabled when connected to its network that allows the user to order goods and services from that provider location from within the application even though the application is not a typical provider ordering application. The features 1114 may be made available and executable via buttons, menus, checkboxes, dialog boxes, and other known objects for receiving user input and performing computer functions.

To enable providing the provider license 1112 to its patrons from the licensing service, the features that the provider wants to be enabled must be programmed into the application by the application creator, and the provider must procure licensing therefrom and registration with the licensing service. Thus, whenever a user is connected to the provider's network, provider license 1112 can be included in the license data structure 1100. Whenever the user is not connected to the provider's network, provider license 1112 is not included in the license data structure 1100, and features 1114 are not available to the user. In this case, the licensing service may return license 106 as discussed with respect to FIG. 2 back to device 102.

The features 1114 enabled by the provider's license 1112 may not include a full list of features that the provider intends to provide but may include a feature that defines additional provider features from a location other than from the license 1102. For example, an enabled provider feature 1114 may include instructions that cause a menu to be generated from a list of features located at an Internet location particular to the provider or located at a location accessible via the provider's network. In this case, the application feature may be programmed to look up the list of features found at the Internet location and dynamically create a menu or other programmable objects therefrom based on whatever features are located at the Internet location. Accordingly, the provider may be able to dynamically change the list of features available to its patrons through the Internet lookup without requiring that the application be reprogrammed accordingly.

Figure 12:
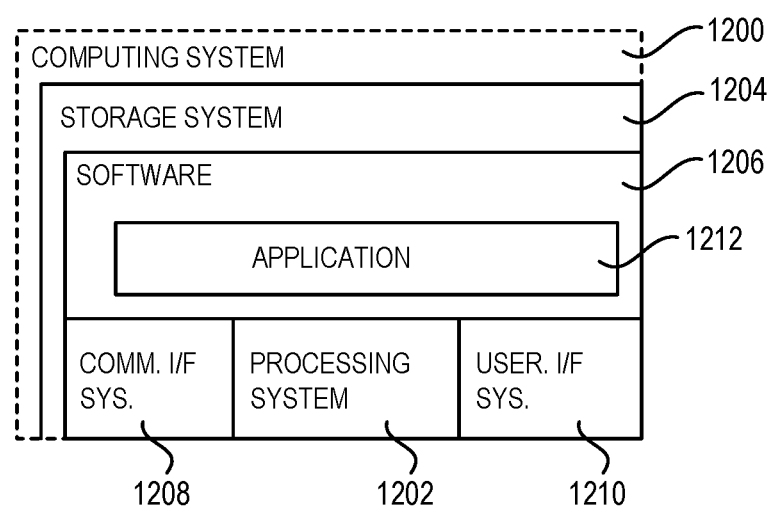
FIG. 12 illustrates a computing system suitable for implementing the software technology disclosed herein, including any of the applications, architectures, elements, processes, and operational scenarios and sequences illustrated in the Figures and discussed below in the Detailed Description.

FIG. 12 illustrates a computing system 1200, which is representative of any system or collection of systems in which the various applications, services, scenarios, and processes disclosed herein may be implemented. Examples of computing system 1200 include, but are not limited to, desktop computers, laptop computers, tablet computers, computers having hybrid form-factors, mobile phones, smart televisions, wearable devices, server computers, blade servers, rack servers, and any other type of computing system (or collection thereof) suitable for carrying out the application launching operations described herein. Such systems may employ one or more virtual machines, containers, or any other type of virtual computing resource in the context of supporting enhanced group collaboration.

Computing system 1200 may be implemented as a single apparatus, system, or device or may be implemented in a distributed manner as multiple apparatuses, systems, or devices. Computing system 1200 includes, but is not limited to, processing system 1202, storage system 1204, software 1206, communication interface system 1208, and user interface system 1210. Processing system 1202 is operatively coupled with storage system 1204, communication interface system 1208, and user interface system 1210.

Processing system 1202 loads and executes software 1206 from storage system 1204. Software 1206 includes application 1212, which is representative of the software applications discussed with respect to the preceding FIGS. 1-11, including application 104. When executed by processing system 1202 to launch the application and request and receive user licenses, application 1212 directs processing system 1202 to operate as described herein for at least the various processes, operational scenarios, and sequences discussed in the foregoing implementations. Computing system 1200 may optionally include additional devices, features, or functionality not discussed for purposes of brevity.

Referring still to FIG. 12, processing system 1202 may comprise a micro-processor and other circuitry that retrieves and executes software 1206 from storage system 1204. Processing system 1202 may be implemented within a single processing device, but may also be distributed across multiple processing devices or sub-systems that cooperate in executing program instructions. Examples of processing system 1202 include general purpose central processing units, application specific processors, and logic devices, as well as any other type of processing device, combinations, or variations thereof.

Storage system 1204 may comprise any computer readable storage media readable by processing system 1202 and capable of storing software 1206. Storage system 1204 may include volatile and nonvolatile, removable and non-removable media implemented in any method or technology for storage of information, such as computer readable instructions, data structures, program modules, or other data. Examples of storage media include random access memory, read only memory, magnetic disks, optical disks, flash memory, virtual memory and non-virtual memory, magnetic cassettes, magnetic tape, magnetic disk storage or other magnetic storage devices, or any other suitable storage media. In no case is the computer readable storage media a propagated signal.

In addition to computer readable storage media, in some implementations, storage system 1204 may also include computer readable communication media over which at least some of software 1206 may be communicated internally or externally. Storage system 1204 may be implemented as a single storage device, but may also be implemented across multiple storage devices or sub-systems co-located or distributed relative to each other. Storage system 1204 may comprise additional elements, such as a controller, capable of communicating with processing system 1202 or possibly other systems.

Software 1206 in general, and application 1212 in particular, may be implemented in program instructions and among other functions may, when executed by processing system 1202, direct processing system 1202 to operate as described with respect to the various operational scenarios, sequences, and processes illustrated herein. For example, application 1212 may include program instructions for implementing feature activation in a launched application, such as methods 300, 400, and 1000.

In particular, the program instructions may include various components or modules that cooperate or otherwise interact to carry out the various processes and operational scenarios described herein. The various components or modules may be embodied in compiled or interpreted instructions, or in some other variation or combination of instructions. Software 1206 may include additional processes, programs, or components, such as operating system software, virtual machine software, or other application software, in addition to or that include application 1212. Software 1206 may also comprise firmware or some other form of machine-readable processing instructions executable by processing system 1202.

In general, application 1212 may, when loaded into processing system 1202 and executed, transform a suitable apparatus, system, or device (of which computing system 1200 is representative) overall from a general-purpose computing system into a special-purpose computing system customized to enhance entity classification operations. Indeed, encoding application 1212 on storage system 1204 may transform the physical structure of storage system 1204. The specific transformation of the physical structure may depend on various factors in different implementations of this description. Examples of such factors may include, but are not limited to, the technology used to implement the storage media of storage system 1204 and whether the computer-storage media are characterized as primary or secondary storage, as well as other factors.

For example, if the computer readable storage media are implemented as semiconductor-based memory, application 1212 may transform the physical state of the semiconductor memory when the program instructions are encoded therein, such as by transforming the state of transistors, capacitors, or other discrete circuit elements constituting the semiconductor memory. A similar transformation may occur with respect to magnetic or optical media. Other transformations of physical media are possible without departing from the scope of the present description, with the foregoing examples provided only to facilitate the present discussion.

Communication interface system 1208 may include communication connections and devices that allow for communication with other computing systems (not shown) over communication networks (not shown). Examples of connections and devices that together allow for inter-system communication may include network interface cards, antennas, power amplifiers, RF circuitry, transceivers, and other communication circuitry. The connections and devices may communicate over communication media to exchange communications with other computing systems or networks of systems, such as metal, glass, air, or any other suitable communication media. The aforementioned media, connections, and devices are well known and need not be discussed at length here.

User interface system 1210 may include a keyboard, a mouse, a voice input device, a touch input device for receiving a touch gesture from a user, a motion input device for detecting non-touch gestures and other motions by a user, and other comparable input devices and associated processing elements capable of receiving user input from a user. Output devices such as a display, speakers, haptic devices, and other types of output devices may also be included in user interface system 1210. In some cases, the input and output devices may be combined in a single device, such as a display capable of displaying images and receiving touch gestures. The aforementioned user input and output devices are well known in the art and need not be discussed at length here.

User interface system 1210 may also include associated user interface software executable by processing system 1202 in support of the various user input and output devices discussed above. Separately or in conjunction with each other and other hardware and software elements, the user interface software and user interface devices may support a graphical user interface, a natural user interface, or any other type of user interface, in which a user interface to an application may be presented (e.g., user interface 102).

Communication between computing system 1200 and other computing systems (not shown), may occur over a communication network or networks and in accordance with various communication protocols, combinations of protocols, or variations thereof. Examples include intranets, internets, the Internet, local area networks, wide area networks, wireless networks, wired networks, virtual networks, software defined networks, data center buses, computing backplanes, or any other type of network, combination of network, or variation thereof. The aforementioned communication networks and protocols are well-known and need not be discussed at length here. In any of the aforementioned examples in which data, content, or any other type of information is exchanged, the exchange of information may occur in accordance with any of a variety of well-known data transfer protocols.

Certain inventive aspects may be appreciated from the foregoing disclosure, of which the following are various examples.

Example 1

A computing apparatus comprising: one or more computer readable storage media; a processing system operatively coupled with the one or more computer readable storage media; and program instructions stored on the one or more computer readable storage media for authenticating a user license for an application after the application has launched that, when executed by the processing system, direct the processing system to at least: responsive to a launch of the application, obtain a license file for the application, the license file comprising: a license data structure comprising: a user license; a licensing service signature; a licensing service public key; and a trusted timestamp package; verify validity of the licensing service public key; if the licensing service public key is invalid, analyze the license data structure using the trusted timestamp package to determine if the licensing service public key was valid when the user license was signed by the licensing service signature; and if the licensing service public key was valid when the user license was signed by the licensing service signature: enable features of the application based on the user license; and initiate presentation of the application in accordance with the enabled features.

Example 2

The computing apparatus of Example 1 wherein trusted timestamp package comprises: a timestamp; a signed hash; and a timestamp authority public key.

Example 3

The computing apparatus of Examples 1-2 wherein the program instructions further direct the processing system to determine that the licensing service public key was valid when the user license was signed by the licensing service signature by matching a timestamp authority hash with a license data structure hash.

Example 4

The computing apparatus of Examples 1-3 wherein the program instructions further direct the processing system to: create a first hash based on the license data structure; and create the license data structure hash based on the combination of the first hash with the timestamp.

Example 5

The computing apparatus of Examples 1-4 wherein the program instructions further direct the processing system to create the timestamp authority hash by applying the timestamp authority public key to the signed hash.

Example 6

The computing apparatus of Examples 1-5 wherein the program instructions further direct the processing system to authenticate the licensing service public key if the timestamp authority hash matches the license data structure hash.

Example 7

The computing apparatus of Examples 1-6 wherein the program instructions further direct the processing system to disable the application if the licensing service public key was invalid when the user license was signed by the licensing service signature.

Example 8

A method for authenticating a user license for an application after the application has launched comprising: responsive to a launch of the application, obtaining a license file for the application, the license file comprising: a license data structure comprising: a user license; a licensing service signature; a licensing service public key; and a trusted timestamp package; verifying validity of the licensing service public key; if the licensing service public key is invalid, analyzing the license data structure using the trusted timestamp package to determine if the licensing service public key was valid when the user license was signed by the licensing service signature; and if the licensing service public key was valid when the user license was signed by the licensing service signature: enabling features of the application based on the user license; and initiating presentation of the application in accordance with the enabled features.

Example 9

The method of Example 8 wherein trusted timestamp package comprises: a timestamp; a signed hash; and a timestamp authority public key.

Example 10

The method of Examples 8-9 further comprising determining that the licensing service public key was valid when the user license was signed by the licensing service signature by matching a timestamp authority hash with a license data structure hash.

Example 11

The method of Examples 8-10 further comprising: creating a first hash based on the license data structure; and creating the license data structure hash based on the combination of the first hash with the timestamp.

Example 12

The method of Examples 8-11 further comprising creating the timestamp authority hash by applying the timestamp authority public key to the signed hash.

Example 13

The method of Examples 8-12 further comprising authenticating the licensing service public key if the timestamp authority hash matches the license data structure hash.

Example 14

The method of Examples 8-13 further comprising disabling the application if the licensing service public key was invalid when the user license was signed by the licensing service signature.

Example 15

One or more computer readable storage media having program instructions stored thereon for authenticating a user license for an application after the application has launched, wherein the program instructions, when executed by a processing system, direct the processing system to at least: obtain a license file comprising a license file for an application responsive to a launch of the application, the license file comprising: a license data structure comprising: a user license; a licensing service signature; a licensing service public key; and a trusted timestamp package; analyze the license data structure using the trusted timestamp package to determine if the licensing service public key was valid when the user license was signed by the licensing service signature; and if the licensing service public key was valid when the user license was signed by the licensing service signature: enable features of the application based on the user license; and initiate presentation of the application in accordance with the enabled features.

Example 16

The one or more computer readable storage media of Example 15 wherein trusted timestamp package comprises: a timestamp; a signed hash; and a timestamp authority public key.

Example 17

The one or more computer readable storage media of Examples 15-16 wherein the program instructions further direct the processing system to determine that the licensing service public key was valid when the user license was signed by the licensing service signature by matching a timestamp authority hash with a license data structure hash.

Example 18

The one or more computer readable storage media of Examples 15-17 wherein the program instructions further direct the processing system to: create a first hash based on the license data structure; and create the license data structure hash based on the combination of the first hash with the timestamp.

Example 19

The one or more computer readable storage media of Examples 15-18 wherein the program instructions further direct the processing system to create the timestamp authority hash by applying the timestamp authority public key to the signed hash.

Example 20

The one or more computer readable storage media of Examples 15-19 wherein the program instructions further direct the processing system to authenticate the licensing service public key if the timestamp authority hash matches the license data structure hash.

The functional block diagrams, operational scenarios and sequences, and flow diagrams provided in the Figures are representative of exemplary systems, environments, and methodologies for performing novel aspects of the disclosure. While, for purposes of simplicity of explanation, methods included herein may be in the form of a functional diagram, operational scenario or sequence, or flow diagram, and may be described as a series of acts, it is to be understood and appreciated that the methods are not limited by the order of acts, as some acts may, in accordance therewith, occur in a different order and/or concurrently with other acts from that shown and described herein. For example, those skilled in the art will understand and appreciate that a method could alternatively be represented as a series of interrelated states or events, such as in a state diagram. Moreover, not all acts illustrated in a methodology may be required for a novel implementation.

The descriptions and figures included herein depict specific implementations to teach those skilled in the art how to make and use the best option. For the purpose of teaching inventive principles, some conventional aspects have been simplified or omitted. Those skilled in the art will appreciate variations from these implementations that fall within the scope of the invention. Those skilled in the art will also appreciate that the features described above can be combined in various ways to form multiple implementations. As a result, the invention is not limited to the specific implementations described above, but only by the claims and their equivalents.

What is claimed is:

1. A computing apparatus comprising:
   one or more computer readable storage media;
   a processing system operatively coupled with the one or more computer readable storage media; and
   program instructions stored on the one or more computer readable storage media for authenticating a user license for an application after the application has launched that, when executed by the processing system, direct the processing system to at least:
   responsive to a launch of the application, obtain a license file for the application, the license file comprising:
   a license data structure comprising:
   a user license;
   a licensing service signature;
   a licensing service public key; and
   a trusted timestamp package;

verify that the licensing service public key is invalid;
analyze the license data structure using the trusted timestamp package to determine if the licensing service public key was valid when the user license was signed by the licensing service signature; and
responsive to determining that the licensing service public key was valid when the user license was signed by the licensing service signature:
enable features of the application based on the user license; and
initiate presentation of the application in accordance with the enabled features.

2. The computing apparatus of claim 1 wherein trusted timestamp package comprises:
a timestamp;
a signed hash; and
a timestamp authority public key.

3. The computing apparatus of claim 2 wherein to determine that the licensing service public key was valid when the user license was signed by the licensing service signature, the program instructions direct the processing system to compare a timestamp authority hash with a license data structure hash.

4. The computing apparatus of claim 3 wherein the program instructions further direct the processing system to:
create a first hash based on the license data structure; and
create the license data structure hash based on the combination of the first hash with the timestamp.

5. The computing apparatus of claim 4 wherein the program instructions further direct the processing system to create the timestamp authority hash by applying the timestamp authority public key to the signed hash.

6. The computing apparatus of claim 3 wherein the program instructions further direct the processing system to authenticate the licensing service public key when the timestamp authority hash matches the license data structure hash.

7. The computing apparatus of claim 1 wherein the program instructions further direct the processing system to disable the application if the licensing service public key was invalid when the user license was signed by the licensing service signature.

8. A method for authenticating a user license for an application after the application has launched, the method comprising:
responsive to a launch of the application, obtaining a license file for the application, the license file comprising:
a license data structure comprising:
a user license;
a licensing service signature;
a licensing service public key; and
a trusted timestamp package;
verifying that the licensing service public key is invalid;
analyzing the license data structure using the trusted timestamp package to determine a validity of the licensing service public key when the user license was signed by the licensing service signature; and
in response to determining that the licensing service public key was valid when the user license was signed by the licensing service signature:
enabling features of the application based on the user license; and
initiating presentation of the application in accordance with the enabled features.

9. The method of claim 8 wherein trusted timestamp package comprises:
a timestamp;
a signed hash; and
a timestamp authority public key.

10. The method of claim 9 wherein determining the validity of the licensing service public key when the user license was signed by the licensing service signature comprises comparing a timestamp authority hash with a license data structure hash.

11. The method of claim 10 further comprising:
creating a first hash based on the license data structure; and
creating the license data structure hash based on the combination of the first hash with the timestamp.

12. The method of claim 11 further comprising creating the timestamp authority hash by applying the timestamp authority public key to the signed hash.

13. The method of claim 10 further comprising authenticating the licensing service public key when the timestamp authority hash matches the license data structure hash.

14. The method of claim 8 further comprising disabling the application in response to determining that the licensing service public key was invalid when the user license was signed by the licensing service signature.

15. One or more computer readable storage media having program instructions stored thereon for authenticating a user license for an application after the application has launched, wherein the program instructions, when executed by a processing system, direct the processing system to at least:
obtain a license file comprising a license file for an application responsive to a launch of the application, the license file comprising:
a license data structure comprising:
a user license;
a licensing service signature;
a licensing service public key; and
a trusted timestamp package;
analyze the license data structure using the trusted timestamp package to determine a validity of the licensing service public key when the user license was signed by the licensing service signature; and
responsive to determining that the licensing service public key was valid when the user license was signed by the licensing service signature:
enable features of the application based on the user license; and
initiate presentation of the application in accordance with the enabled features.

16. The one or more computer readable storage media of claim 15 wherein trusted timestamp package comprises: a timestamp; a signed hash; and a timestamp authority public key.

17. The one or more computer readable storage media of claim 16 wherein to determine the validity of the licensing service public key when the user license was signed by the licensing service signature, the program instructions direct the processing system to compare a timestamp authority hash with a license data structure hash.

18. The one or more computer readable storage media of claim 17 wherein the program instructions further direct the processing system to:
create a first hash based on the license data structure; and
create the license data structure hash based on the combination of the first hash with the timestamp.

19. The one or more computer readable storage media of claim 18 wherein the program instructions further direct the processing system to create the timestamp authority hash by applying the timestamp authority public key to the signed hash.

20. The one or more computer readable storage media of claim 17 wherein the program instructions further direct the processing system to authenticate the licensing service public key when the timestamp authority hash matches the license data structure hash.

\* \* \* \* \*